United States Patent [19]

Watanabe

[11] Patent Number: 5,575,245
[45] Date of Patent: Nov. 19, 1996

[54] LIQUID COOLING ARRANGEMENT FOR ENGINE

[75] Inventor: Takahide Watanabe, Hamamatsu, Japan

[73] Assignee: Sanshin Kogyo Kabushiki Kaisha, Hamamatsu, Japan

[21] Appl. No.: 301,322

[22] Filed: Sep. 6, 1994

[30] Foreign Application Priority Data

Sep. 6, 1993 [JP] Japan .................................. 5-221277

[51] Int. Cl.⁶ .................................................. F02B 75/18
[52] U.S. Cl. ................................ 123/41.74; 123/193.3; 277/235 B
[58] Field of Search ............................ 123/193.3, 41.74; 277/235 B

[56] References Cited

U.S. PATENT DOCUMENTS 4,683,844  8/1987  Arai et al. ............................ 123/41.74
4,979,758  12/1990  Miyaoh ............................... 277/235 B

FOREIGN PATENT DOCUMENTS 2-42165  2/1990  Japan ................................ 277/235 B Primary Examiner—Noah P. Kamen
Attorney, Agent, or Firm—Knobbe, Martens, Olson & Bear

[57] ABSTRACT

An improved cylinder head, cylinder block, and cylinder head gasket arrangement, wherein the gasket and cylinder head are configured in such a way that no water can be trapped in the area between the cylinder head gasket and the cylinder head sealing surfaces in areas where the cylinder head gasket is not engaged by a surface of the cylinder block that faces the surface of the cylinder head engaged by the gasket.

16 Claims, 6 Drawing Sheets

LIQUID COOLING ARRANGEMENT FOR ENGINE

BACKGROUND OF THE INVENTION

This invention relates to a liquid cooling arrangement for an engine and more particularly to an improved gasket and sealing arrangement between two members of a liquid cooled internal combustion engine.

As is well known, internal combustion engines and particularly liquid cooled engines have a number of mating parts with sealing gaskets interposed therebetween. When the engine is water cooled, these sealing gaskets perform the function of sealing the water passages so that water may flow from the cooling jacket of one member to the cooling jacket of another member while providing a seal around the flow area.

Frequently, the opening of the cooling jacket in the sealing surface of one member does not line up completely with the opening of the cooling jacket formed in the facing surface of the other member. For example, it is commonly the case that where the cylinder head and cylinder block meet, the cylinder block cooling jacket has an opening in the surface that faces the cylinder head which is substantially larger than the corresponding flow opening that communicates the cylinder head cooling jacket with the cylinder block cooling jacket.

This gives rise to a problem which may be best understood by reference to FIG. 1 that shows a sealing arrangement of the type commonly found in prior art constructions between a cylinder block, indicated generally by the reference numeral 11 and a cylinder head indicated generally by the reference numeral 12 with a sealing gasket 13 being interposed between facing surfaces 14 and 15 of the cylinder block 11 and cylinder head 12, respectively. As may be seen, the cylinder block 11 has a cooling jacket 16 which has an opening 17 in its surface 14. The cylinder head 12 has a cooling jacket shown partially at 18 and which has an opening 19 in its sealing face 15 which is substantially smaller than the cylinder block cooling jacket opening 17.

As is common practice, however, the interposed gasket 13 has an opening 21 in it which is slightly larger than the cylinder head opening 19 but substantially smaller than the cylinder block opening 17. This means that there is a surface area between the cylinder head gasket 13 and the cylinder head gasket surface 15 that is not backed up by a corresponding surface of the cylinder block 11. As a result, liquid coolant can become trapped between these facing surfaces and remain there even when the cooling jacket of the engine is drained of water. This can present problems, particularly when the engine is utilized in such applications as outboard motors wherein the cooling jacket is frequently drained of water when the outboard motor is taken out of use or even when it is tilted up out of the water and still attached to the transom of a watercraft. The resulting water entrapment can cause corrosion, particularly when the outboard motor has experienced salt water through operation in a marine environment.

With the discontinuation of the use of asbestos as a gasket material and the substitution of metal such as stainless steel for the gasket material, these problems become even more acute.

It is, therefore a principal object of this invention to provide an improved gasket and sealing arrangement for a water cooled engine.

It is a further object of this invention to provide an improved gasket and sealing arrangement for an engine wherein areas that may exist between the facing surface of one of the engine members around an opening that is not backed up by engagement with a facing surface of the other member due to differences in the size and location of their respective openings may be drained easily of water that may be otherwise entrapped between the gasket and the surface of the one member.

SUMMARY OF THE INVENTION

This invention is adapted to be embodied in a gasket and sealing arrangement for a water cooled engine having a pair of members having facing surfaces to be sealed. A first water jacket is formed in one of the members and has a first opening in the facing surface of the one member. A second water jacket is formed in the other of the members and has a second opening in the facing surface of the other member. The openings are sized and configured so that when the facing surfaces are in their facing relationship, at least a portion of one of the openings is in confronting relationship with a portion of the facing surface of the other of the members. A sealing gasket is received between the facing surfaces and has a portion that extends across the portion of the facing surface of the other member that is in line with the opening in the one member. Means are provided for permitting water to be drained from the area between the sealing gasket portion and the other member portion, even though the portions are in sealing engagement.

DETAILED DESCRIPTION OF THE PREFERRED EMBODIMENT OF THE INVENTION

Figure 1:
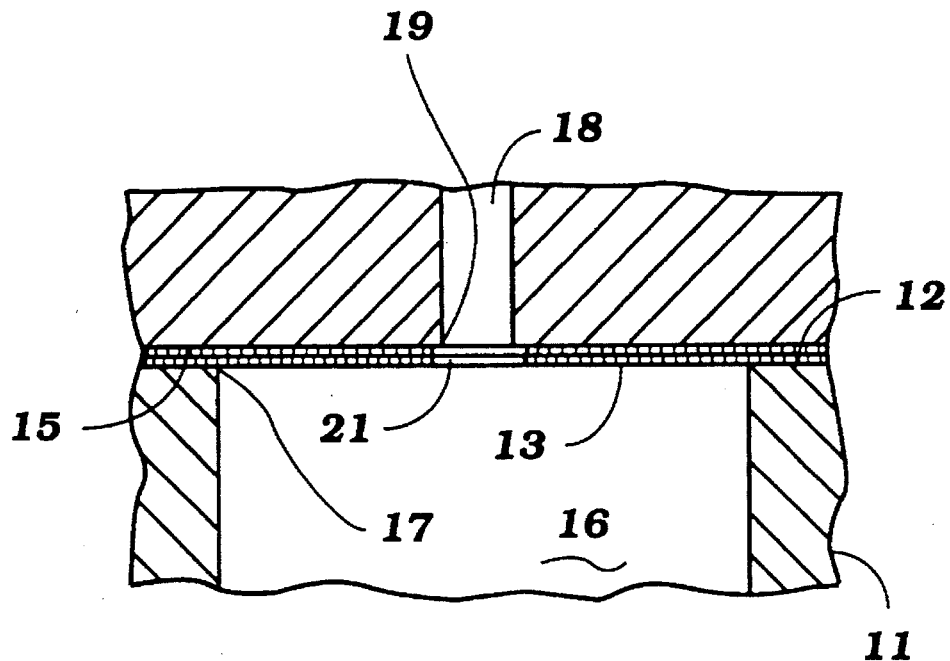
FIG. 1 is a cross-sectional view taken through a portion of a cylinder head, cylinder block, and sealing gasket arrangement in accordance with the prior art type of constructions.

The concept under which the invention operates will first be described by reference to FIG. 3, which corresponds to FIG. 1 of the prior art construction and which, when compared with this figure, will enable those skilled in the art to understand the concept and structure by which the invention operates.

Like the prior art type of constructions, the engine is comprised of a cylinder block 51 and a cylinder head 52 that have respective facing surfaces between which a sealing gasket 53 is interposed. These facing surfaces of the cylinder block and cylinder head are indicated at 54 and 55, respectively.

As with the prior art constructions, the cylinder block 51 is formed with a cooling jacket 56 that has an opening 57 in its sealing surface 54. The cylinder head 52 has a cooling jacket 58, which is defined by an opening 59 in its sealing surface 55. As with the prior art constructions, the cylinder head gasket 53 is provided with an opening 61 through which the opening 57 of the cylinder block cooling jacket 56 communicates with the opening 59 of the cylinder head cooling jacket 58 for delivery of coolant.

However, unlike the prior art constructions, the cylinder head sealing surface 57 is provided with a plurality of small pockets 62, 63, 64, and 65, which overlie the cylinder block cooling jacket opening 57 but which are spaced outwardly from the cylinder head cooling jacket opening 59 and which are, except as will hereinafter be described, isolated from the cylinder head cooling jacket. These pockets 62, 63, 64, and 65 cooperate with respective openings 66 and 67 formed in the cylinder head gasket 53. Thus even though they are not backed up with engaging surfaces of the cylinder block 51 coolant can flow out of the area between the cylinder head gasket 53 and the cylinder head surface 57 through the gasket opening 66 and 67 when the cooling jacket is drained. This will drain the pockets 62, 63, 64, and 65 and ensure that all water will be drained out of the cooling jackets of both the cylinder head 52 and cylinder block 51. It should be noted that such arrangements can be employed between any two members of the engine which are in sealing engagement and which have a similar situation with respect to alignment of openings formed in sealing surfaces that communicate with respective cooling jackets of the members.

Having the principal of the invention in mind, now the entire structure of the seal between the cylinder block 51 and cylinder head 52 will be described by reference to FIGS. 2–8. First, the construction of the cylinder block 51 will be described by reference to FIGS. 4 and 5. As may be seen, the cylinder block 51 is formed with a generally continuous inner wall that is surrounded by the cooling jacket 56 and which is provided with a plurality of bores 68 that receive pressed or cast-in cylinder liners 69 which, in turn, have internal bores 71 in which the pistons of the engine reciprocate in a well-known manner.

There are, in addition to the opening 57 in the sealing surface 54 at the top of the sealing block 51, a number of other openings; however, these are basically conventional and for the purposes of understanding the invention need not be described. However, among these openings are tapped openings that receive studs 72 for affixing the cylinder head 52 to the cylinder block 51. These are formed equidistant from the centers of the cylinder bores 71, as is well known.

The construction and configuration of the sealing surface 57 of the cylinder head 52 will now be described by particular reference to FIGS. 4 and 6. The cylinder bores are shown in phantom circles in this figure and are identified by the same reference numerals 71 for orientation purposes. It should be noted that recesses 73 are formed in the cylinder head surface 57 over each of the cylinder bores 71, and these recesses form a portion of the combustion chamber of the engine, as is well known in this art.

In the illustrated embodiment, the engine is of the overhead valve type, and each combustion chamber recess 73 is formed with an intake port 74 that is formed at the termination of an intake passage 75 formed in the cylinder head 52 and which terminates in an opening 76 formed in the surface 57 which is matingly engaged with the remainder of the induction system, which may be considered to be conventional for the purposes of understanding the invention in this case.

In addition, exhaust ports 77 are formed in the combustion chamber recesses 73 at the termination of exhaust passages 78 that extend through the cylinder head 52 and which terminate in exhaust discharge openings 79 that communicate with an exhaust system, which also may be considered to be conventional for the purposes of this description.

As has been noted, the cylinder head 52 is formed with a cooling jacket, and this cooling jacket surrounds each of the combustion chamber recesses 73 and is supplied with water from the cylinder block cooling jacket 56. FIG. 3 shows one opening 59 that cooperates with the cylinder jacket, but FIG. 6 shows the additional openings formed around each of the cylinder head combustion chamber recesses 53, and in addition to the reference numeral 59, the reference numerals 81, 82, 83, and 84 represent the remaining openings that are formed in the surface 57 of the cylinder head 52 and which communicate with the cylinder block cooling jacket openings 57. As has been noted, the number and size and spacings of the openings 57, 81, 82, 83, and 84 are such that portions of the cylinder block openings 57 are in facing relationship to the cylinder head sealing surface 57, rather than corresponding cylinder head cooling jacket openings.

Figure 3:
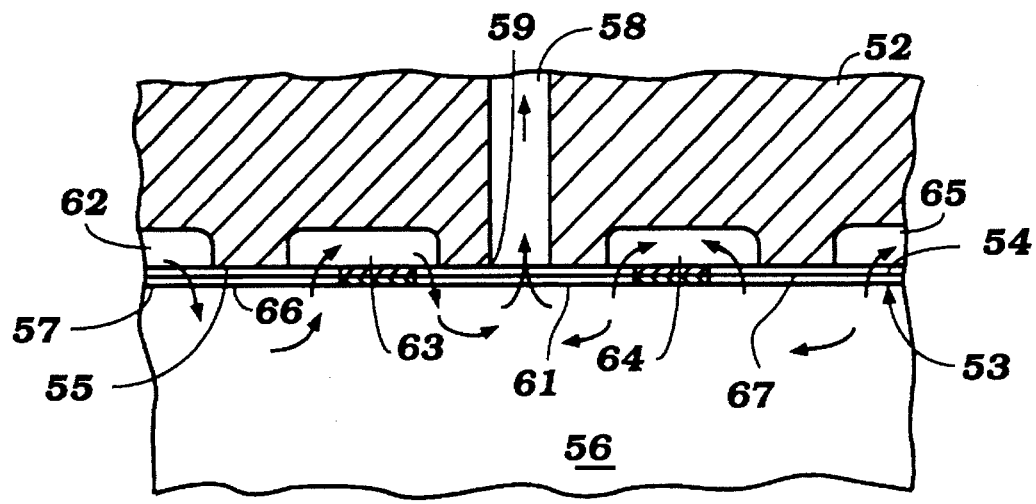
FIG. 3 is a cross-sectional view taken along the line 3—3 of FIG. 2 and corresponds in part to FIG. 1 for comparison with the prior art type of construction so as to more clearly understand the invention.
Figure 6:
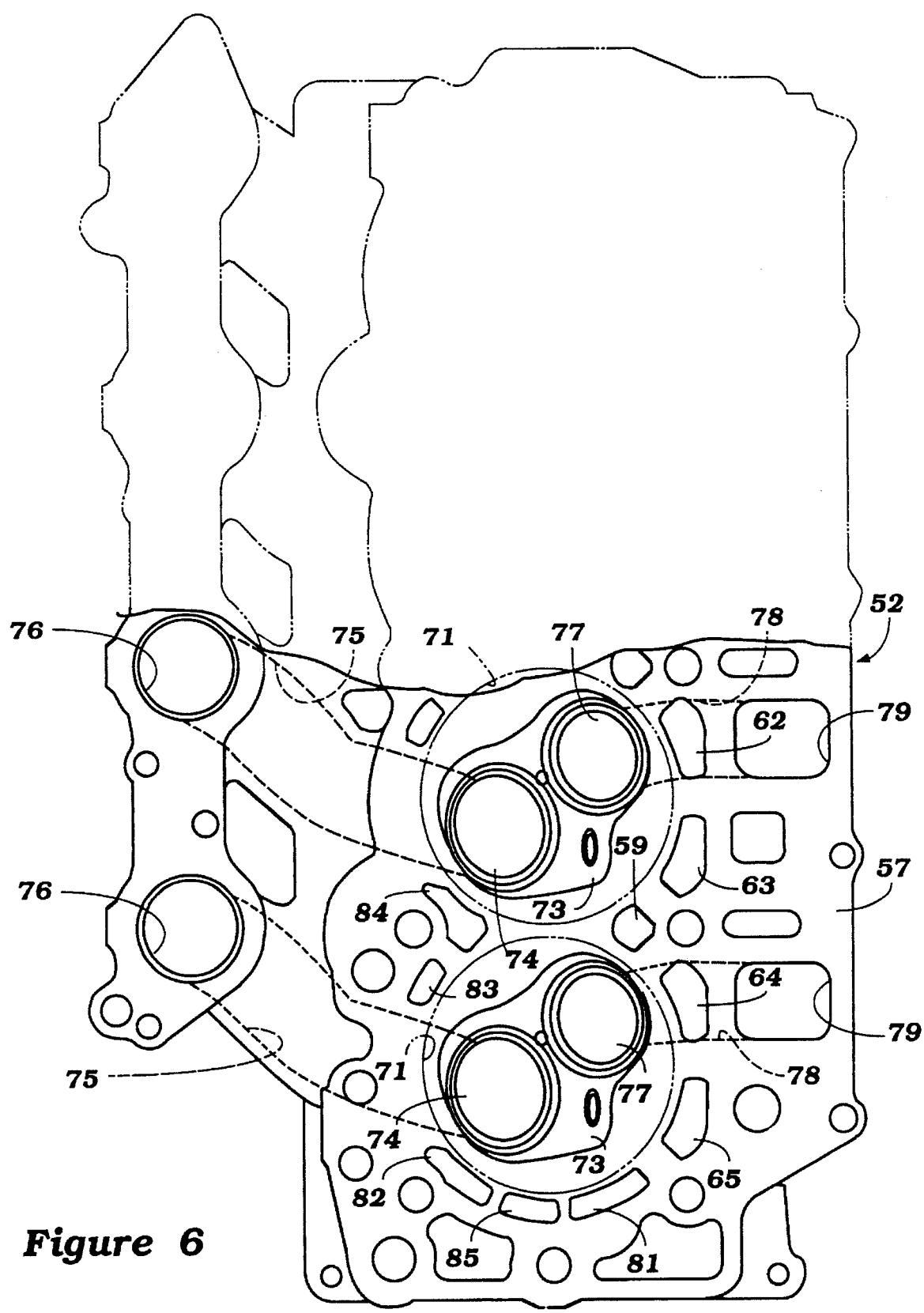
FIG. 6 is a bottom plan view, looking in the same direction as FIG. 2 but on a smaller scale, showing the cylinder head without the gasket in place.

Still referring to FIG. 6, it should be noted that the pockets 62, 63, 64, and 65 shown in FIG. 3 also appear in this figure. In addition to these pockets, the cylinder head surface 56 is formed with one additional pocket that does not show in FIG. 3, and this pocket is identified by the reference numeral 85 and serves the same purpose, as will become apparent, as the pockets 62, 63, 64, and 65.

Figure 8:
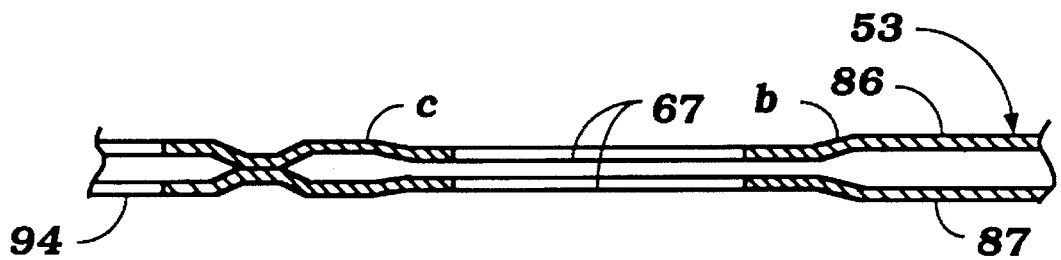
FIG. 8 is a cross-sectional view taken along the line 8—8 of FIG. 7.
Figure 2:
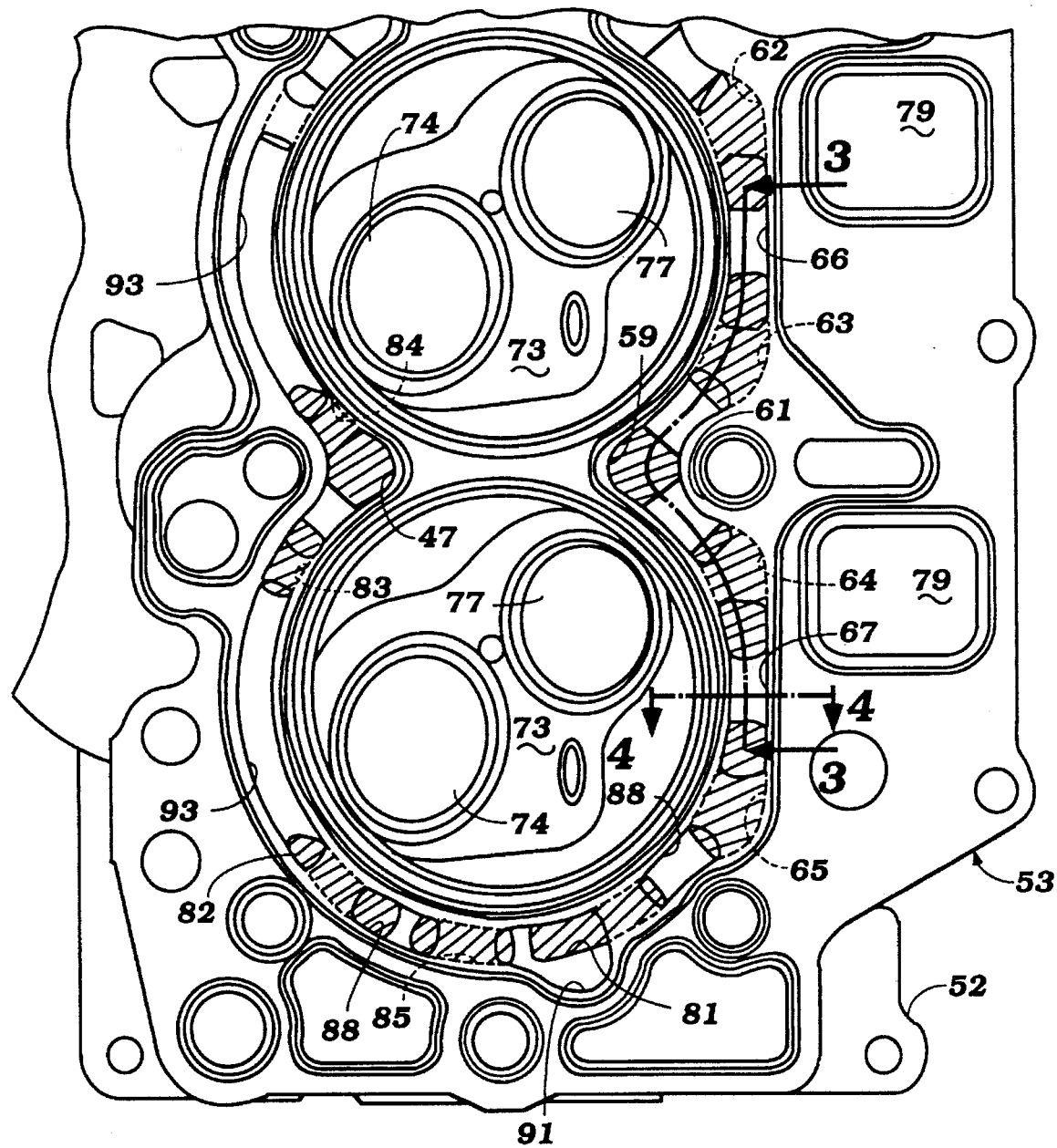
FIG. 2 is a bottom plan view of the cylinder head of an engine constructed in accordance with an embodiment of the invention with the sealing head gasket lying on the sealing surface of the head.
Figure 7:
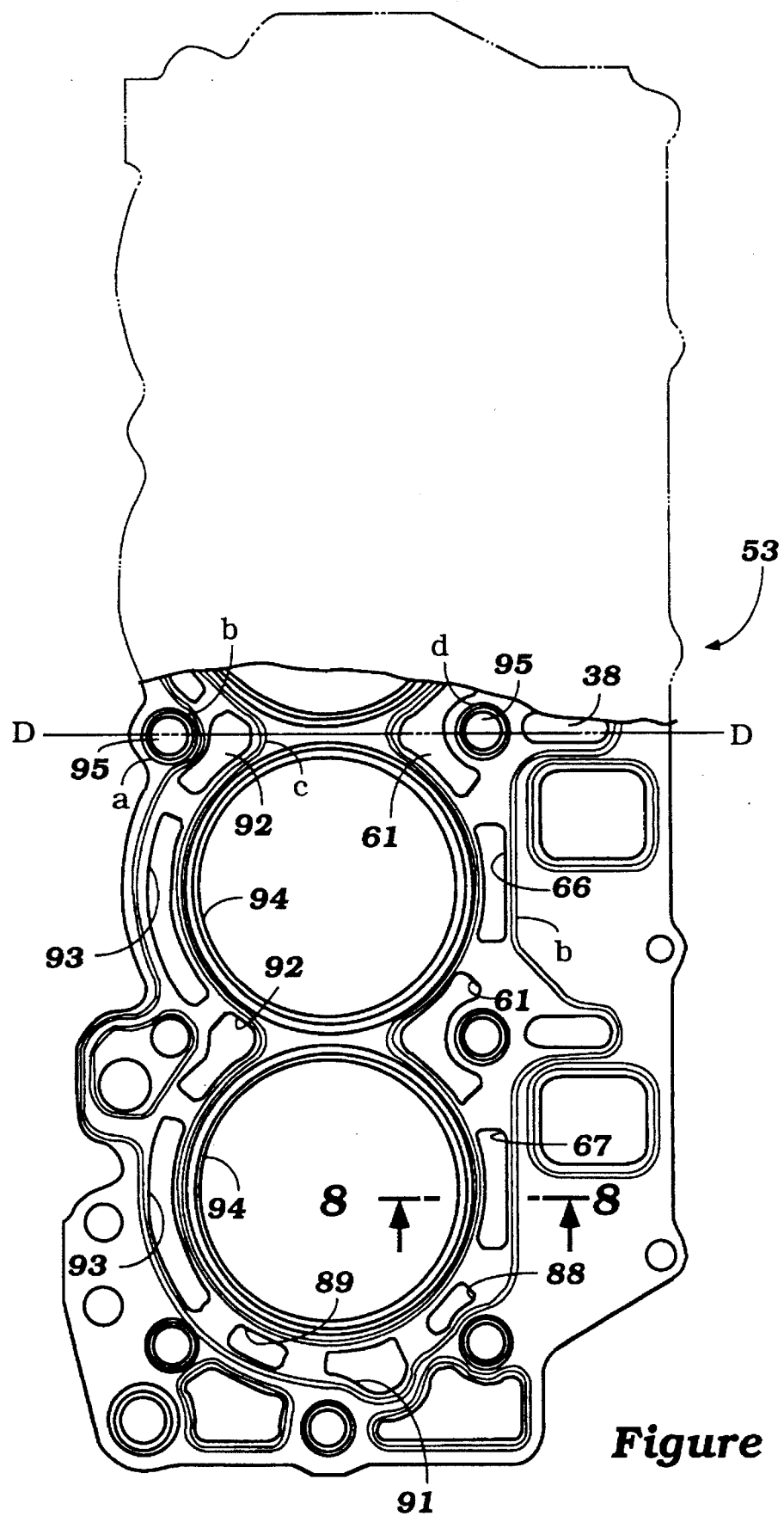
FIG. 7 is a view, in part similar to FIG. 6, but shows the cylinder head gasket alone.

The cylinder head gasket 53 will now be described in more detail; first, by reference to FIGS. 7 and 8, wherein the cylinder head gasket 53 is shown alone, and later by reference to FIG. 2 wherein it is shown superimposed upon the cylinder head sealing surface 57. The cylinder head gasket 53 is formed from stainless steel and is comprised of a pair of pieces 86 and 87, which may be fixed to each other at specified places and which have an initial pre-installed configuration so as to provide a number of ribs for compression and improved sealing purposes. The cylinder head gasket 53 is provided with a number of openings, some of which have already been described but will again be mentioned so that the orientation can be best understood. These include the openings 61 formed on the exhaust side of the gasket and which communicate the cylinder block cooling jacket openings 57 with the cylinder head cooling jacket openings 59. These passages 61 are formed between adjacent of the cylinder bores 71. In addition, the passages 66 and 67, which communicate with the pockets 62, 63 and 64, 65, are formed in the area between the passages 61.

At the ends of the cylinder head, the cylinder head gasket 53 is provided with a pair of openings 88 and 89. The passage 88 communicates with the pocket 65 and with the water inlet opening 81 in this end of the cylinder head for draining the pocket 65 and also for supplying water from the cylinder block cooling jacket to the cylinder head cooling jacket through the passage 81. In a like manner, the opening 89 communicates the pocket 85 with the cylinder block cooling jacket and also with the cylinder head cooling jacket through the opening 82 at this end of the engine.

There is further provided an opening 91 which communicates the pocket 85 with the cylinder head water jacket inlet opening 81.

On the intake side of the engine, the cylinder head gasket 53 is provided with openings 92 that are disposed between adjacent cylinder bores and which communicate with the cylinder head cooling jacket openings 83 and 84 on adjacent combustion chamber recesses 73.

There are further provided elongated openings 93 on the intake side of the cylinder head gasket, which span the area between the openings 89 and 92 and which communicate with the cylinder head cooling jacket inlet openings 82 and 83 so as to ensure complete water flow and drainage.

Figure 4:
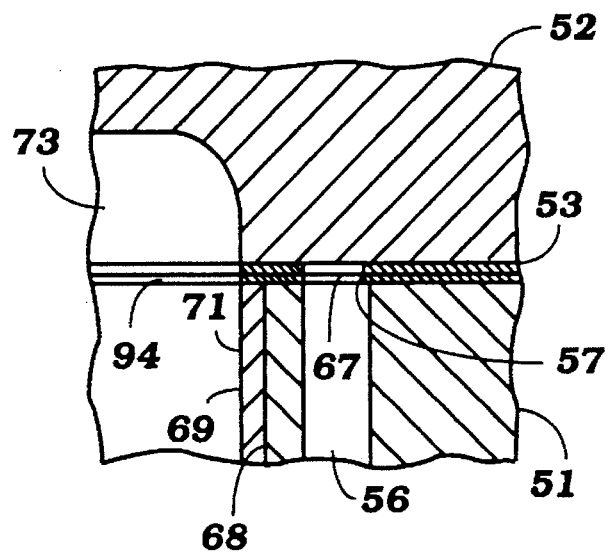
FIG. 4 is a cross-sectional view taken along the line 4—4 of FIG. 2.
Figure 5:
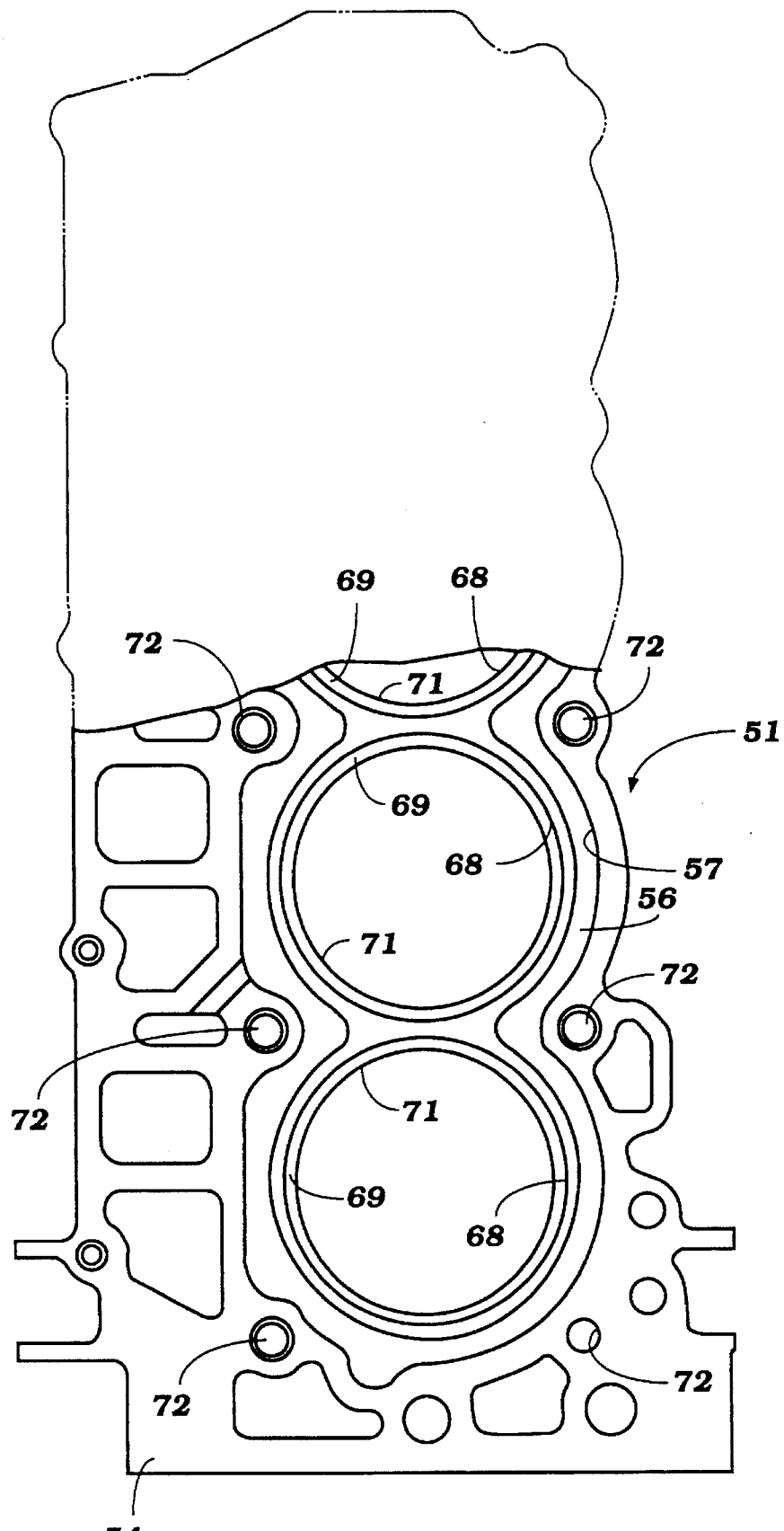
FIG. 5 is a top plan view of the cylinder block.

The cylinder head gasket 53 is also provided with circular openings 94 which are aligned with the cylinder bores 71 and which sealingly engage the upper ends of the liners 69 and the adjacent portion of the cylinder block forming the bore 68, as shown in FIG. 4, for sealing purposes.

Among other holes formed in the cylinder head gasket 53 are holes 95 which pass the cylinder head hold-down studs 72 from the cylinder block. It should be noted that the cylinder head gasket 53 is provided with a plurality of raised ribs a, b, c, and d extending transversely across the gasket 53 along the line DD that extend around various portions of the head so as to improve the compression sealing of the gasket 53.

From the foregoing description, it should be readily apparent that the described construction provides an extremely effective cylinder head gasket and one which will ensure not only good water and compression sealing, but also will ensure that areas where the gasket may be engaged only with one of the two sealing surfaces and extend across the water jacket of the other will not provide water traps that could retain water and cause corrosion when the cooling jacket is drained. Of course, the foregoing description is that of the preferred embodiment of the invention, and various changes and modifications may be made without departing from the spirit and scope of the invention as defined by the appended claims.

I claim:

1. A gasket and sealing arrangement for a water-cooled engine having a pair of members having facing surfaces to be sealed, a first water jacket formed in one of said members and having a first opening in the facing surface of said one member, a second water jacket formed in the other of said members and having a second opening in the facing surface of the other of said members, said openings being sized and configured so that when said facing surfaces are in their facing relationship flow between said openings is permitted and at least a portion of one of said openings is in confronting relationship with a portion of the facing surface of the other of said members, a sealing gasket received and compressed between said facing surfaces, said sealing gasket having a portion extending across and at least partially positioned to be directly engaged only on one side by said portion of the facing surface of the other of said members with the other side of said portion of said gasket being in facing relation to said portion of said one opening so that said one side of said gasket portion and said portion of said facing of said other member are in facing relation without compression of said portion of said gasket, and means comprising a pocket formed in the portion of said facing surface of said other member forming a substantially unrestricted flow path for permitting water to drain from the area between said uncompressed portion of said sealing gasket and said other member portion to said one opening when said members and sealing gasket are assembled.

2. A gasket and sealing arrangement as in claim 1, wherein the means for permitting water to drain also comprises an opening formed in the sealing gasket portion.

3. A gasket and sealing arrangement as in claim 1, wherein the pocket is not in direct communication with the second cooling jacket.

4. A gasket and sealing arrangement as in claim 3, wherein the means for permitting water to drain further includes an opening in the sealing gasket in registry with the pocket.

5. A gasket and sealing arrangement as in claim 1, wherein one of the members comprises a cylinder head and the other of the members comprises a cylinder block.

6. A gasket and sealing arrangement as in claim 5, wherein the sealing gasket has an opening aligned with a cylinder bore of the cylinder block and in sealing engagement with the cylinder block-facing surface around the cylinder bore.

7. A gasket and sealing arrangement as in claim 6, wherein the means for permitting water to drain further comprises an opening formed in the sealing gasket portion.

8. A gasket and sealing arrangement as in claim 6, wherein the pocket is not in direct communication with the second cooling jacket.

9. A gasket and sealing arrangement as in claim 8, wherein the means for permitting water to drain further includes an opening in the sealing gasket in registry with the pocket.

10. A gasket and sealing arrangement as in claim 9, wherein the sealing gasket is comprised of a pair of spaced-apart gasket elements affixed to each other.

11. A gasket and sealing arrangement as in claim 10, wherein the sealing gasket is formed from a metal.

12. A gasket and sealing arrangement as in claim 1, wherein the sealing gasket is comprised of a pair of spaced-apart gasket elements affixed to each other.

13. A gasket and sealing arrangement as in claim 12, wherein the sealing gasket is formed from a metal.

14. A gasket and sealing arrangement as in claim 13, wherein the means for permitting water to drain further comprises an opening formed in the sealing gasket portion.

15. A gasket and sealing arrangement as in claim 13, wherein the pocket is not in direct communication with the second cooling jacket.

16. A gasket and sealing arrangement as in claim 15, wherein the means for permitting water to drain further includes an opening in the sealing gasket in registry with the pocket.

* * * * *